US008884466B2

(12) United States Patent
Oh

(10) Patent No.: US 8,884,466 B2
(45) Date of Patent: *Nov. 11, 2014

(54) HIGH VOLTAGE POWER SUPPLY

(75) Inventor: Chul-woo Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,348

(22) Filed: Sep. 14, 2012

(65) Prior Publication Data
US 2013/0009487 A1 Jan. 10, 2013

Related U.S. Application Data

(63) Continuation of application No. 13/350,101, filed on Jan. 13, 2012, now Pat. No. 8,283,807, which is a continuation of application No. 13/064,328, filed on Mar. 18, 2011, now Pat. No. 8,283,806, which is a continuation of application No. 12/025,809, filed on Feb. 5, 2008, now Pat. No. 7,932,640.

(30) Foreign Application Priority Data

Jun. 7, 2007 (KR) .................. 2007-55714

(51) Int. Cl.
H02J 1/00 (2006.01)
G03G 15/00 (2006.01)
H02M 7/00 (2006.01)
H02M 1/44 (2007.01)

(52) U.S. Cl.
CPC ............... *H02M 7/003* (2013.01); *G03G 15/80* (2013.01); *H02M 1/44* (2013.01)
USPC ............................... 307/83; 307/42; 307/147

(58) Field of Classification Search
USPC ......... 307/17, 42, 83, 147; 336/232; 361/777, 361/794, 783, 760
See application file for complete search history.

(56) References Cited

U.S. PATENT DOCUMENTS 5,835,367 A 11/1998 Pan et al.
7,932,640 B2 4/2011 Oh (Continued)

FOREIGN PATENT DOCUMENTS

KR 10-0635282 11/2006

OTHER PUBLICATIONS

U.S. Office Action mailed Feb. 15, 2012 issued in related U.S. Appl. No. 13/064,328.

(Continued)

*Primary Examiner* — Fritz M Fleming
(74) *Attorney, Agent, or Firm* — Staas & Halsey LLP

(57) ABSTRACT

A high voltage power supply (HVPS) including first and second high voltage output controllers controlling output of a high voltage output signal; and a plurality of transformers transforming an output signal provided from the first and second high voltage output controller, disposed outside of the first and second high voltage controllers on the substrate, wherein output terminals in the secondary sides of the plurality of transformers are disposed along the edge of the substrate. Therefore, the volume of a system can be minimized by arranging circuits in each component for high voltage output in parallel, and spark and discharge can be reduced by minimizing interference between the primary sides and the secondary sides of the components for high voltage output, thereby preventing damage to a product.

16 Claims, 3 Drawing Sheets

(56) References Cited

U.S. PATENT DOCUMENTS

| | | | |
|---|---|---|---|
| 8,283,806 B2* | 10/2012 | Oh | 307/83 |
| 8,283,807 B2* | 10/2012 | Oh | 307/83 |
| 2004/0074086 A1 | 4/2004 | Yamaguchi et al. | |
| 2007/0036576 A1 | 2/2007 | Cho et al. | |

OTHER PUBLICATIONS

Korean Office Action mailed Oct. 11, 2006 in related Korean Patent Application No. 10-2008-0017413 (4pages).

U.S. Office Action mailed Feb. 16, 2012 issued in related U.S. Appl. No. 13/350,101.

U.S. Office Action dated Apr. 16, 2009, issued in the file history of U.S. Appl. No. 12/025,809.

U.S. Office Action dated Mar. 18, 2010, issued in the file history of U.S. Appl. No. 12/025,809.

U.S. Office Action dated Aug. 31, 2010, issued in the file history of U.S. Appl. No. 12/025,809.

U.S. Office Action dated Feb. 7, 2011, issued in the file history of U.S. Appl. No. 12/025,809.

U.S. Office Action dated Aug. 19, 2011, issued in the file history of U.S. Appl. No. 13/064,328.

Notice of Allowance issued in co-pending U.S. Appl. No. 13/064,328 mailed Jun. 11, 2012.

Office Action issued in co-pending U.S. Appl. No. 12/025,809 mailed Nov. 30, 2009.

Notice of Allowance issued in co-pending U.S. Appl. No. 13/350,101 mailed Jun. 13, 2012.

Notice of Allowance issued in co-pending U.S. Appl. No. 12/025,809 mailed Feb. 7, 2012.

U.S. Appl. No. 12/025,809, filed Feb. 5, 2008, Chul-woo Oh, Samsung Electronics Co., Ltd.

U.S. Appl. No. 13/064,328, filed Mar. 18, 2011, Chul-woo Oh, Samsung Electronics Co., Ltd.

U.S. Appl. No. 13/350,101, filed Jan. 13, 2012, Chul-woo Oh, Samsung Electronics Co., Ltd.

* cited by examiner

US 8,884,466 B2

HIGH VOLTAGE POWER SUPPLY

CROSS-REFERENCE TO RELATED APPLICATION

This application is a continuation of U.S. application Ser. No. 13/350,101, now U.S. Pat. No. 8,283,807, filed Jan. 13, 2012 which is a continuation of Ser. No. 13/064,328, now U.S. Pat. No. 8,283,806, filed Mar. 18, 2011 which is a continuation of U.S. application Ser. No. 12/025,809, now U.S. Pat. No. 7,932,640, filed Feb. 5, 2008, and claims the benefit of Korean Patent Application No. 2007-55714 filed in the Korean Intellectual Property Office on Jun. 7, 2007, the disclosure of which is incorporated herein by reference.

BACKGROUND

1. Field

Aspects of the present invention relate to a high voltage power supply (HVPS) employed in an image forming apparatus, which has a small size, and improved efficiency and performance by using an optimal layout.

2. Related Art

FIG. 1 is a block diagram of an arrangement of components on a substrate in a typical high voltage power supply (HVPS) circuit utilized in an image forming apparatus, such as a laser printer, a facsimile machine, a photocopier, and a multifunctional product. As shown in FIG. 1, the high voltage power supply (HVPS) comprises an input connector 110; first and second high voltage output controllers 120 and 130; first through eighth transformers 140, 142, 144, 146, 150, 152, 154, and 156; and output terminals 141, 143, 145, 147, 151, 153, 155, and 157, disposed on a substrate (circuit board) 100. The first high voltage output controller 120 generates a high voltage, and is disposed in a first section of the substrate 100 closely adjacent to output terminals in secondary sides 151, 153, 155, and 157 of fifth through eighth transformers 150, 152, 154, and 156. However, because of an inappropriate disposition of the output terminals, not enough separation between output terminals is provided for the output terminals of the fifth through eighth transformers 150, 152, 154, and 156 disposed on a second section of the substrate 100. In addition, an electromagnetic effect occurs between each component, since signal lines provided from an input connector 110 are disposed in a complicated manner on and beneath the surface of the substrate 100. The larger size of the substrate 100 results in a larger image forming apparatus.

The above-described layout causes an overshoot due to the separation between the output terminals 140, 142, 144, 146, 150, 152, 154, and 156, damage to the image forming apparatus caused by an electric arc, and instability of a high voltage output from the HVPS caused by the electric arc. The size of the substrate 100 thus becomes larger and an inefficient jumper occurs. Given the micro-miniaturization trend of recent years, the large size of the substrate 100 creates a significant limitation. In particular, the separation between the components on the first section of the substrate 100 and the components on the second section of the substrate 100 second, as well as the separation between the high voltage output terminals, must be carefully calculated, since the HVPS circuit may control voltages ranging from a low voltage at 24.5 V to a high voltage, according to a predetermined number of turns. Unlike the output terminals 141, 143, 145, and 147 disposed on the first section of the substrate 100, the output terminals 151, 153, 155, and 157 disposed on the second section of the substrate 100 generate a voltage higher than 5 kV. If the separation distance is not enough and a pattern between the first high voltage output controller 120 and the second high voltage output controller 130 is arranged in a complicated manner, an abnormal operation may occur when generating an output voltage, which may cause the image forming apparatus to overheat or malfunction.

SUMMARY

Aspects of the present invention provide a high voltage power supply (HVPS) having an optimal layout by arranging each component from an input terminal of the HVPS to a final high voltage output terminal in parallel.

Additional aspects and/or advantages of the invention will be set forth in part in the description which follows and, in part, will be obvious from the description, or may be learned by practice of the invention.

According to an aspect of the present invention, an HVPS is provided. The HVPS includes first and second high voltage output controllers disposed on a substrate to control output of a high voltage output signal; first and second plurality of transformers disposed on the substrate outside of the first and second high voltage controllers to transform the output signal provided from the first and second high voltage output controllers, respectively; and output terminals connected to secondary sides of the first and second plurality of transformers and disposed along edges of the substrate; wherein the output terminals connected to the first plurality of transformers are disposed along the edge of the substrate closest to the first plurality of transformers, and the output terminals connected to the second plurality of transformers are disposed along the edge of the substrate closest to the second plurality of transformers.

According to another aspect of the present invention, an HVPS is provided. The HVPS includes a high voltage output controller disposed on a substrate to control an output of a high voltage output signal; a plurality of transformers disposed on the substrate between an edge of the substrate and the high voltage output controller to transform output signals provided from the high voltage output controller; and output terminals connected to the secondary sides of the plurality of transformers and disposed along the edge of the substrate; wherein the high voltage output controller, the plurality of transformers, and the output terminals in the second part are disposed on the substrate in parallel, respectively.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
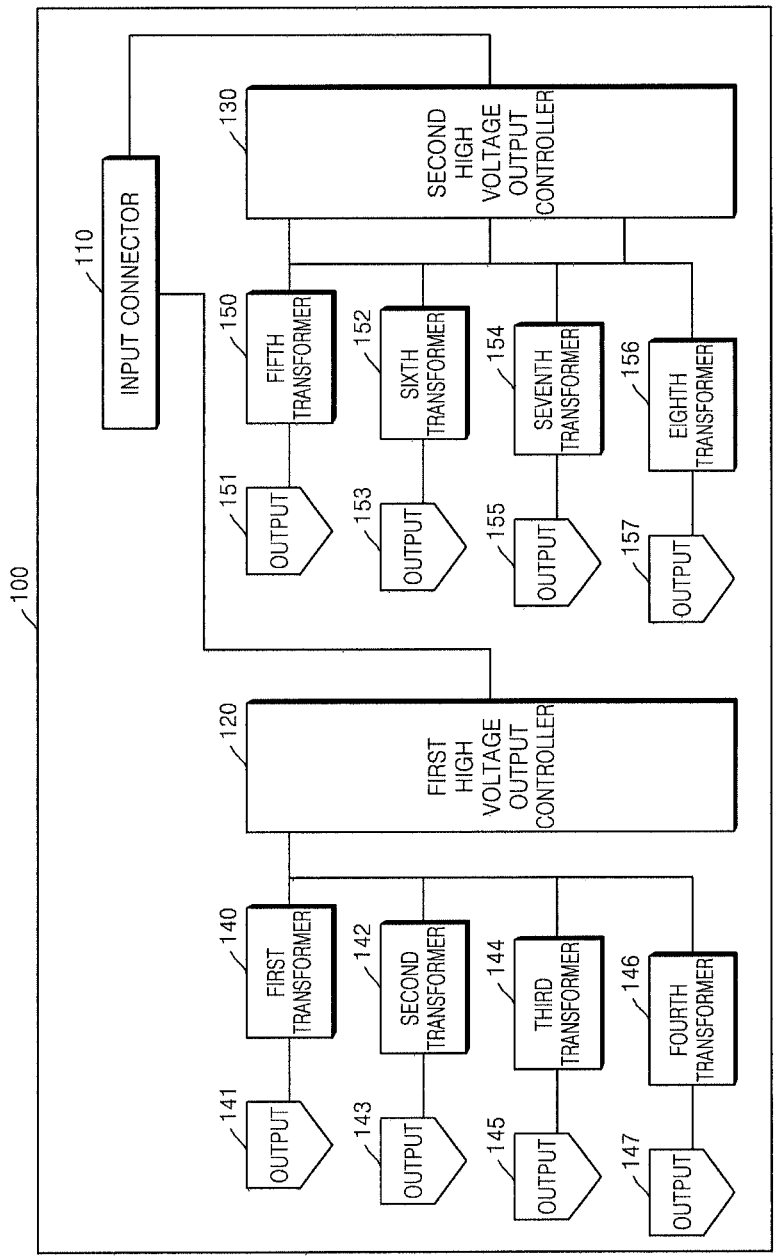
FIG. 1 is a block diagram illustrating a typical high voltage power supply (HVPS) circuit disposed on a substrate.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
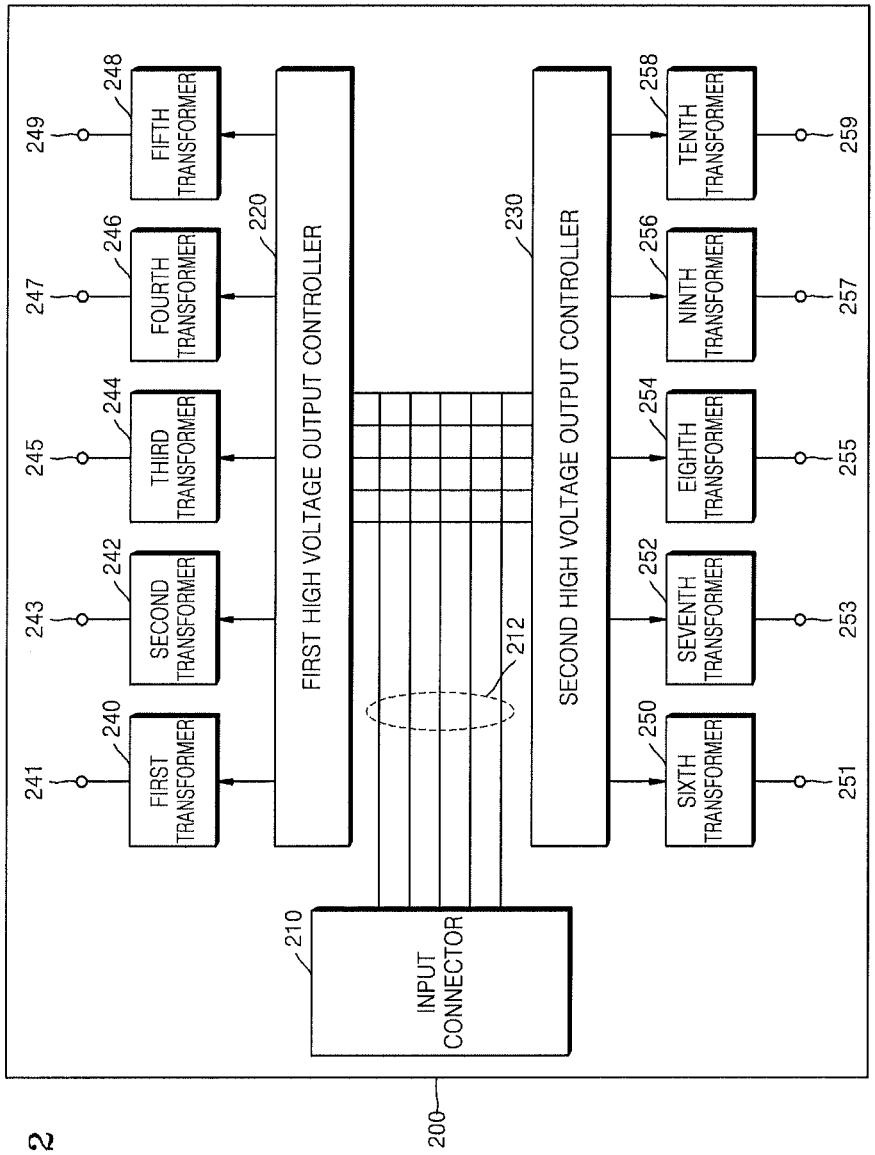
FIG. 2 is a block diagram of an HVPS circuit disposed on a substrate according to an example embodiment of the present invention.

FIG. 2 is a block diagram of an optimal layout of components of a high voltage power supply (HVPS) circuit on a substrate 200 according to an example embodiment of the present invention. As shown in FIG. 2, the optimal layout of the HPVS circuit on the substrate 200 includes an input connector 210; first and second high voltage output controllers 220 and 230; connection lines 212 connecting the input connector 210 to the first and second high voltage output controllers 220 and 230; first through tenth transformers 240, 242, 244, 246, 248, 250, 252, 254, 256, and 258; output terminals 241, 243, 245, 247, and 249 connected to secondary sides of the first through fifth transformers 240, 242, 244, 246, and 248; and output terminals 251, 253, 255, 257, and 259 connected to secondary sides of the sixth through tenth transformers 250, 252, 254, 256, and 258.

The input connector 210 provides a signal to the first and second high voltage output controllers 220 and 230. The first high voltage output controller 220 and the second high voltage output controller 230 output a high voltage output signal in order to supply a high voltage to a apparatus, such as an image forming apparatus. The first through fifth transformers 240, 242, 244, 246, and 248 transform each signal provided from the first high voltage output controller 220. Sixth through tenth transformers 250, 252, 254, 256, and 258 transform an output signal provided from the second high voltage output controller 230. Finally, the output terminals 241, 243, 245, 247, 249, 251, 253, 255, 257, and 259 provide the transformed output signals to the apparatus. The particular makeup of the components arranged on the substrate 100 is not a limiting factor; for example, any type of transformer may be used as the first through tenth transformers 240, 242, 246, 248, 250, 252, 254, 256, and 258.

The input connector 210 is disposed on one side of the substrate 200. The connection lines 212 are arranged in the middle part (a central region) of the substrate 200. As shown in FIG. 2, the first high voltage output controller 220 and the second high voltage output controller 230 are arranged on the substrate 200 so as to face each other and are separated by a predetermined distance from the middle part of the substrate 200. The first and second high voltage output controllers 220 and 230 may be arranged on a first and second section of the substrate 200, respectively, as shown in FIG. 2.

The first through fifth transformers 240, 242, 244, 246, and 248 are disposed on the substrate 200 outside of the first high voltage controller 220. Output terminals in the secondary sides 241, 243, 245, 247, and 249 of the first through fifth transformers 240, 242, 244, 246, and 248 are disposed along the edge of the substrate 200 closest to the first through fifth transformers 240, 242, 244, 246, and 248. The first through fifth transformers 240, 242, 244, 246, and 248 and their corresponding output terminals 241, 243, 245, 247, and 249 are disposed in parallel on the substrate 200, respectively. Accordingly, unlike in the typical HVPS, a distance between high voltage output controllers and output terminals can be maintained within a predetermined or greater distance, and space on the substrate 200 of the HVPS can be maximized, allowing for the use of a smaller substrate as compared to a typical substrate.

As shown in FIG. 2, the sixth through tenth transformers 250, 252, 254, 256, and 258 are disposed on the substrate 200 outside of the second high voltage controller 230. The output terminals 251, 253, 255, 257, and 259 are disposed along the edge of the substrate 200 closest to the sixth through tenth transformers 250, 252, 254, 256, and 258. The sixth through tenth transformers 250, 252, 254, 256, and 258 and their output terminals in the secondary sides 251, 253, 255, 257, and 259 are disposed in parallel on the substrate 200, respectively. Accordingly, unlike in the conventional HVPS, a distance between high voltage output controllers and output terminals can be maintained within a predetermined or greater distance, and a space in the substrate 200 of the HVPS can be maximized, allowing for the use of a smaller substrate as compared to a typical substrate.

The output terminals 241, 243, 245, 247, and 249 of the first through fifth transformers 240, 242, 244, 246, and 248 and the output terminals 251, 253, 255, 257, and 259 of the sixth through tenth transformers 250, 252, 254, 256, and 258 are disposed on the substrate 200 as far apart as possible. An electromagnetic effect is minimized when these output terminals are far apart from each other. For example, a separation distance between output terminals in the secondary sides may be greater than 2 mm when a high voltage output is 1 kV, and greater than 10 mm when a high voltage output is 5 kV.

Figure 3:
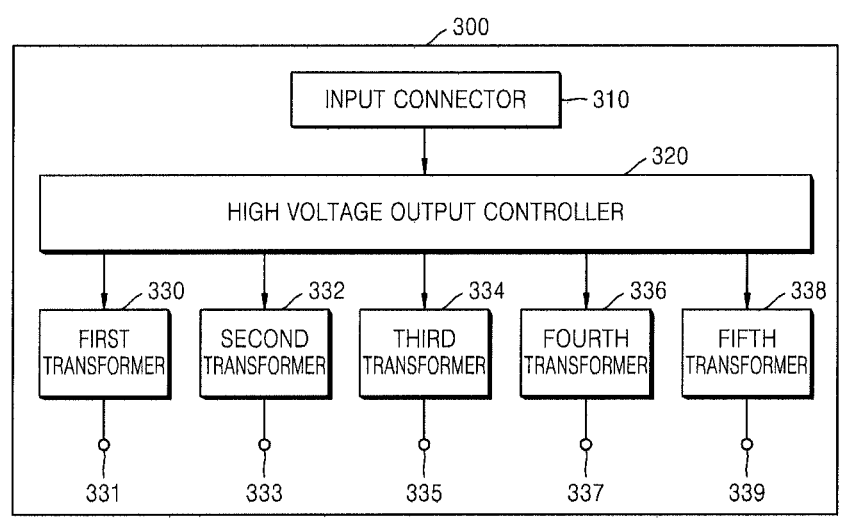
FIG. 3 is a block diagram of an HVPS circuit disposed on a substrate according to another example embodiment of the present invention.

FIG. 3 is a block diagram of an arrangement of components on a substrate in an HVPS according to another example embodiment of the present invention. An input connector 310 supplies power to a high voltage output controller 320, and is disposed at one side of a substrate 300. The high voltage output controller 320 controls output of a high voltage output signal using the power provided by the input connector 310. First through fifth transformers 330, 332, 334, 336, and 338 transform output signals controlled by the high voltage output controller 320. Output terminals 331, 333, 335, 337, and 339 are connected to the secondary sides of the first through fifth transformers 330, 332, 334, 336, and 338 to provide the transformed high voltage output signal to the apparatus.

The first through fifth transformers 330, 332, 334, 336, and 338 are disposed along an edge of the substrate 300. As shown in FIG. 3, the first through fifth transformers 330, 332, 334, 336, and 338, and output terminals 331, 333, 335, 337, and 339 are disposed in a line. The first through fifth transformers 330, 332, 334, 336, and 338, and their output terminals 331, 333, 335, 337, and 339 are disposed in parallel on the substrate 300. Accordingly, unlike in a typical HVPS, a distance between high voltage output controllers and output terminals can be maintained within a predetermined or greater distance, and a space in the substrate 300 of the HVPS can be maximized.

The output terminals 331, 333, 335, 337, and 339 of the first through fifth transformers 330, 332, 334, 336, and 338 are disposed as far apart as possible from each other. An electromagnetic effect is minimized when these output terminals are far apart from each other. For example, a separation distance between output terminals in the secondary sides may be greater than 2 mm when a high voltage output is 1 kV, and greater than 10 mm when a high voltage output is 5 kV.

An HVPS having the above-described arrangement on the substrate 300 may be used in an image forming apparatus, such as a printer, facsimile machine, copier, or a multi-functional printer.

In an HVPS according to aspects of the present invention, a volume of a system can be minimized by arranging circuits in each component for high voltage output in parallel. Sparks and discharges can be reduced by minimizing interference between the components for high voltage output, thereby preventing damage to a product.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, as discussed above, an image forming apparatus according to aspects of the present invention may include an image forming unit to form an image onto a printable medium and an HVPS to supply power to the image forming unit arranged on a substrate according to aspects of the present invention. Accordingly, it is intended, therefore, that the present invention not be limited to the various example embodiments disclosed, but that the present invention includes all embodiments falling within the scope of the appended claims.

What is claimed is:

1. A high voltage power supply (HVPS) comprising:
    a substrate having a first direction, the substrate having an upper area comprising a first edge portion and a lower area comprising a second edge portion with respect to the first direction;
    a first high voltage output controller disposed on the upper area of the substrate;
    a first plurality of transformers disposed on the upper area of the substrate to transform output signals of the first high voltage output controller as first transformed signals, the first plurality of transformers comprising first primary input terminals to receive output signals of the first high voltage output controller and first secondary output terminals to output the first transformed signals;
    a first plurality of edge output terminals disposed on the first edge portion, to be connected to the first secondary output terminals;
    a second high voltage output controller disposed on the lower area of the substrate;
    a second plurality of transformers disposed on the lower area of the substrate to transform output signals of the second high voltage output controller as second transformed signals, the second plurality of transformers comprising second primary input terminals to receive output signals of the second high voltage output controller and second secondary output terminals to output the second transformed signals; and
    a second plurality of edge output terminals to be connected to the second secondary output terminals,
    wherein the first high voltage output controller is disposed closer to the first primary input terminals than the first secondary output terminals and controls the first plurality of transformers,
    the second high voltage output controller controls the second plurality of transformers, and
    the first secondary output terminals are disposed closer to the first edge portion than the first primary input terminals.

2. The HVPS of claim 1, further comprising an input connector that is disposed on the substrate and connected to the first and second high voltage output controllers via first connection lines.

3. The HVPS of claim 2, wherein the first connection lines do not pass adjacent to second connection lines that connect the first plurality of edge output terminals and the first secondary output terminals.

4. The HVPS of claim 1, wherein the first plurality of output terminals are arranged on the substrate as far apart from one another as possible so as to minimize electromagnetic effects between each of the first plurality of edge output terminals.

5. The HVPS of claim 1, wherein a separation distance between each of the first secondary output terminals is greater than 2 mm when a high voltage output is 1 kV, and greater than 10 mm when a high voltage output is 5 kV.

6. An image forming apparatus comprising:
    an image forming unit to form an image onto a printable medium; and
    a high voltage power supply (HVPS) to supply power to the image forming unit,
    the HVPS comprising:
        a substrate having a first direction, the substrate having an upper area comprising a first edge portion and a lower area comprising a second edge portion with respect to the first direction;
        a first high voltage output controller disposed on the upper area of the substrate;
        a first plurality of transformers disposed on the upper area of the substrate to transform output signals of the first high voltage output controller as first transformed signals, the first plurality of transformers comprising first primary input terminals to receive output signals of the first high voltage output controller and first secondary output terminals to output the first transformed signals;
        a first plurality of edge output terminals disposed on the first edge portion, to be connected to the first secondary output terminals;
        a second high voltage output controller disposed on the lower area of the substrate;
        a second plurality of transformers disposed on the lower area of the substrate to transform output signals of the second high voltage output controller as second transformed signals, the second plurality of transformers comprising second primary input terminals to receive output signals of the second high voltage output controller and second secondary output terminals to output the second transformed signals; and
        a second plurality of edge output terminals to be connected to the second secondary output terminals,
        wherein the first high voltage output controller is disposed closer to the first primary input terminals than the first secondary output terminals and controls the first plurality of transformers,
        the second high voltage output controller controls the second plurality of transformers, and
        the first secondary output terminals are disposed closer to the first edge portion than the first primary input terminals.

7. The image forming apparatus of claim 6, further comprising an input connector that is disposed on the substrate and connected to the first and second high voltage output controllers via first connection lines.

8. The image forming apparatus of claim 7, wherein the first connection lines do not pass adjacent to second connection lines that connect the first plurality of edge output terminals and the first secondary output terminals.

9. The image forming apparatus of claim 6, wherein the first plurality of output terminals are arranged on the substrate as far apart from one another as possible so as to minimize electromagnetic effects between each of the first plurality of edge output terminals.

10. The image forming apparatus of claim 6, wherein a separation distance between each of the first secondary output terminals is greater than 2 mm when a high voltage output is 1 kV, and greater than 10 mm when a high voltage output is 5 kV.

11. A high voltage power supply (HVPS) comprising:
a substrate comprising an edge portion;
an input connector disposed on the substrate;
a high voltage output controller disposed on the substrate;
a plurality of transformers disposed on the substrate, transforming output signals of the high voltage output controller, and comprising primary input terminals to receive the output signals of the high voltage output controller and secondary output terminals to output the transformed signals; and
a plurality of output terminals disposed in the edge area of the substrate and connected to the secondary output terminals,
wherein the high voltage output controller is disposed closer to the primary input terminals than the secondary output terminals of the plurality of transformers and controls the plurality of transformers,
the secondary output terminals are disposed closer to the edge portion than the primary input terminals of the plurality of transformers, and
connection lines connecting the input connector and the high voltage controller do not pass adjacent to the connection lines connecting the secondary output terminals of the plurality of transformers and the plurality of output terminals.

12. The HVPS of claim 11, wherein the plurality of output terminals are arranged on the substrate as far apart from one another as possible so as to minimize electromagnetic effects between each of the plurality of output terminals.

13. The image forming apparatus of claim 11, wherein a separation distance between each of the plurality of output terminals is greater than 2 mm when a high voltage output is 1 kV, and greater than 10 mm when a high voltage output is 5 kV.

14. An image forming apparatus comprising:
an image forming unit to form an image onto a printable medium; and
a high voltage power supply (HVPS) to supply power to the image forming unit,
the HVPS comprising:
a substrate comprising an edge portion;
an input connector disposed on the substrate;
a high voltage output controller disposed on the substrate;
a plurality of transformers disposed on the substrate, transforming output signals of the high voltage output controller, and comprising primary input terminals to receive the output signals of the high voltage output controller and secondary output terminals to output the transformed signals; and
a plurality of output terminals disposed in the edge area of the substrate and connected to the secondary output terminals,
wherein the high voltage output controller is disposed closer to the primary input terminals than the secondary output terminals of the plurality of transformers and controls the plurality of transformers,
the secondary output terminals are disposed closer to the edge portion than the primary input terminals of the plurality of transformers, and
connection lines connecting the input connector and the high voltage controller do not pass adjacent to the connection lines connecting the secondary output terminals of the plurality of transformers and the plurality of output terminals.

15. The image forming apparatus of claim 14, wherein the plurality of output terminals are arranged on the substrate as far apart from one another as possible so as to minimize electromagnetic effects between each of the plurality of output terminals.

16. The image forming apparatus of claim 14, wherein a separation distance between each of the plurality of output terminals is greater than 2 mm when a high voltage output is 1 kV, and greater than 10 mm when a high voltage output is 5 kV.

* * * * *

UNITED STATES PATENT AND TRADEMARK OFFICE
CERTIFICATE OF CORRECTION

| | | |
|---|---|---|
| PATENT NO. | : 8,884,466 B2 | Page 1 of 1 |
| APPLICATION NO. | : 13/617348 | |
| DATED | : November 11, 2014 | |
| INVENTOR(S) | : Chul-woo Oh | |

It is certified that error appears in the above-identified patent and that said Letters Patent is hereby corrected as shown below:

In the Claims

Column 7, line 46, In Claim 13, delete "The image forming apparatus" and insert -- The HVPS --, therefor.

Signed and Sealed this
Eighteenth Day of August, 2015

Michelle K. Lee
*Director of the United States Patent and Trademark Office*